United States Patent [19]
Perlman et al.

[11] Patent Number: 6,141,693
[45] Date of Patent: Oct. 31, 2000

[54] METHOD AND APPARATUS FOR EXTRACTING DIGITAL DATA FROM A VIDEO STREAM AND USING THE DIGITAL DATA TO CONFIGURE THE VIDEO STREAM FOR DISPLAY ON A TELEVISION SET

[75] Inventors: Stephen Perlman, Mountain View; Phil Goldman, Los Altos, both of Calif.

[73] Assignee: Webtv Networks, Inc., Mountain View, Calif.

[21] Appl. No.: 09/107,335

[22] Filed: Jun. 30, 1998

Related U.S. Application Data

[63] Continuation-in-part of application No. 08/656,924, Jun. 3, 1996, Pat. No. 5,918,013.

[51] Int. Cl.[7] .................................................. G06F 15/15
[52] U.S. Cl. .......................... 709/236; 709/200; 709/203; 709/228; 709/231; 709/246; 348/180; 348/460
[58] Field of Search ...................... 709/227–229, 709/236–237, 246–247, 200–204, 217–219, 231; 348/6–7, 11–14, 169–170, 180, 561–565, 23–25, 460–461

[56] References Cited

U.S. PATENT DOCUMENTS

| | | | |
|---|---|---|---|
| 4,706,121 | 11/1987 | Young | 358/142 |
| 4,862,268 | 8/1989 | Campbell et al. | 358/141 |
| 4,962,428 | 10/1990 | Tong et al. | 358/188 |
| 4,977,455 | 12/1990 | Young | 358/142 |
| 5,210,611 | 5/1993 | Yee et al. | 358/191.1 |
| 5,260,788 | 11/1993 | Takano et al. | 358/142 |
| 5,274,753 | 12/1993 | Roskowski et al. | 395/135 |
| 5,351,129 | 9/1994 | Lai | 348/584 |
| 5,353,121 | 10/1994 | Young et al. | 348/563 |
| 5,390,027 | 2/1995 | Henmi et al. | 358/335 |
| 5,402,187 | 3/1995 | Ezaki | 348/474 |
| 5,404,393 | 4/1995 | Remillard | 379/96 |
| 5,420,923 | 5/1995 | Beyers, II et al. | 380/20 |
| 5,442,390 | 8/1995 | Hooper et al. | 348/7 |
| 5,450,134 | 9/1995 | Legate | 348/467 |
| 5,477,274 | 12/1995 | Akiyoshi et al. | 348/468 |
| 5,479,266 | 12/1995 | Young et al. | 358/335 |
| 5,479,268 | 12/1995 | Young et al. | 358/335 |
| 5,519,438 | 5/1996 | Elliott et al. | 348/180 |
| 5,532,753 | 7/1996 | Buchner et al. | 348/569 |
| 5,532,754 | 7/1996 | Young et al. | 348/569 |
| 5,537,151 | 7/1996 | Orr et al. | 348/564 |

(List continued on next page.)

FOREIGN PATENT DOCUMENTS

| | | | |
|---|---|---|---|
| 0 749 081 A1 | 12/1996 | European Pat. Off. | G06F 17/60 |
| WO90/05350 | 5/1990 | WIPO | G09B 5/06 |

OTHER PUBLICATIONS

Hewlett–Packard Company, "MPEG–2 Digital Video Technology & Testing," Copyright 1995.

Holborow, Clive E., "MPEG–2 Systems: A Standard Packet Multiplex Format For Cable Digital Services," AT&T Bell Laboratories (No Date).

*Primary Examiner*—Ahmad F. Matar
*Assistant Examiner*—Bharat Barot
*Attorney, Agent, or Firm*—Workman, Nydegger, Seeley

[57] ABSTRACT

An apparatus and method for combining digital information with at video stream and for using the digital information to modify or augment video frames in the video stream is disclosed. The apparatus for decoding a video stream comprises a video receiver configured to receive a video stream, the video stream including a plurality of video frames. A video processor is configured to receive auxiliary data corresponding to the video stream, the auxiliary data including the information indicative of at least one video frame of the plurality of video frames. The video processor is further configured to modify the video frame in accordance with the auxiliary data. The video processor uses the received auxiliary data to identify a portion of the at least one video frame, the portion being modified in the act of modifying the video frame, other portions of the at least one video frame not being so modified. The video processor applies a filter to the portion of the at least one video frame.

18 Claims, 15 Drawing Sheets

U.S. PATENT DOCUMENTS

| | | | |
|---|---|---|---|
| 5,539,471 | 7/1996 | Myhrvold et al. | 348/473 |
| 5,550,576 | 8/1996 | Klosterman | 348/6 |
| 5,555,025 | 9/1996 | McArthur | 348/478 |
| 5,561,471 | 10/1996 | Kim et al. | 348/565 |
| 5,610,653 | 3/1997 | Abecassis | 348/170 |
| 5,790,792 | 8/1998 | Dydgeon et al. | 709/212 |
| 5,915,090 | 6/1999 | Joseph et al. | 709/200 |
| 5,931,925 | 8/1999 | McNabb et al. | 709/237 |
| 5,953,506 | 9/1999 | Kalra et al. | 709/231 |
| 5,982,445 | 11/1999 | Eyer et al. | 709/218 |
| 6,021,433 | 2/2000 | Payne et al. | 709/236 |

METHOD AND APPARATUS FOR EXTRACTING DIGITAL DATA FROM A VIDEO STREAM AND USING THE DIGITAL DATA TO CONFIGURE THE VIDEO STREAM FOR DISPLAY ON A TELEVISION SET

The present application is a continuation-in-part of the U.S. patent application Ser. No. 08/656,924, filed on Jun. 3, 1996, now U.S. Pat. No 5,918,013.

FIELD OF THE INVENTION

The present invention relates to video systems or television systems for displaying video on a television set. Specifically, the present invention pertains to the processing of digital data in combination with a video stream.

DESCRIPTION OF RELATED ART

In conventional television broadcast systems, a video stream is produced and broadcast to viewers via a variety of media including radio wave, cable systems, telephone networks, or computer networks. The video stream comprises a sequence of video frames or images that combine to form a motion video image on a television screen or computer system monitor. Such video streams can be processed as an analog signal which is displayed on a conventional television set. Alternatively, such video streams can be created, for example, by converting conventional analog video information to a digital format using conventional encoding algorithms such as the Motion Picture Experts Group (MPEG) algorithm standardized by the International Standards Organization (ISO). An MPEG encoded video stream can be delivered over a variety of digital network media.

In a typical television image, a video frame is referred to as a raster and consists of a plurality of scan lines transmitted and displayed sequentially for each video frame. At known intervals between the display of each video frame, a vertical blanking interval (VBI) occurs at a defined time and of a defined duration. During the VBI, the display of video information is suspended. As well known in the art, digital data can be combined with the video stream during the VBI and extracted on the receiving end. One such method is described in U.S. Pat. No. 5,555,025 entitled "Apparatus and Method for Performing Asynchronous Multi Standard VBI Data Extraction" issued Sep. 10, 1996. This patent describes an asynchronous circuit for decoding vertical blanking interval (VBI) television data having any one of a plurality of VBI formats. In general, the patent describes VBI decoding circuitry for extracting VBI data from an input television signal.

Alternatively, data can be inserted directly in to a video signal as disclosed in U.S. Pat. No. 5,539,471. (the '471 patent). This patent describes a technique for inserting a data signal into a persisting video signal in a transmitter so that the data signal is transmitted along with the video signal. The data signal is separated from the video signal at the receiver. The '471 patent describes the extracted data signal as useful for the transmission of digital music, database information, computer subscriber data, or the like.

U.S. Pat. No. 5,351,129 entitled "Video Multiplexer-Encoder and Decoder-Converter" issued Sep. 27, 1994 (herein the '129 patent) describes a video multiplexer-encoder and decoder-converter including a video multiplexer and encoder for selectively receiving, time-division multiplexing and encoding multiple video signals representing multiple video images for transfer and simultaneous display thereof in a selected pattern of multiple video windows on a video display device. The encoded multiplexed video signal includes display control data which selectively represents the position, size, and relative visibility priority for each one of the video images within the selected display pattern of multiple video windows. The '129 patent is typical of prior art systems for displaying multiple video windows on a high resolution computer monitors. These systems typically have a significant level of control over the images generated on the computer monitor.

By contrast, a typical broadcast television video stream is an amorphous collection of video information providing no detail as to the content of each video frame. This lack of content definition in a typical television video stream makes it difficult to configure the displayed video image for particular television sets or video monitors. For example, it may be necessary to center a video image on a variety of differently sized monitors. Currently there is no way of centering a video image on a television based on the video image content. Without knowledge of the content of a video frame or knowledge of the optimal center point for the frame, important portions of the video frame may be undesirably clipped or rendered undisplayable. In other circumstances, it may be necessary to shift, scale, or reposition a particular video frame depending on the image content of the video frame. Prior art systems do not provide a means or method for performing these kinds of manipulations on television video streams.

In addition, it may be necessary to manipulate the content of a particular video frame depending upon the types of objects or elements being displayed in the video frame. For example, some kinds of shapes or colors in the video image may be more susceptible to flicker, unwanted artifacts, or other display variations or degradations depending on the quality or type of television set being used to display the video image. It would be desirable to provide a system for augmenting a conventional television video stream with information useful for configuring the display of the video stream on a particular television set or monitor and further providing enough information to perform various video frame enhancements to improve or augment the display of information on a particular television set or video monitor.

SUMMARY OF THE INVENTION

An apparatus and method for combining digital information with a video stream and for using the digital information to modify or augment video frames in the video stream is disclosed. The apparatus for decoding a video stream comprises a video receiver configured to receive a video stream, the video stream including a plurality of video frames. A video processor is configured to receive auxiliary data corresponding to the video stream, the auxiliary data including the information indicative of at least one video frame of the plurality of video frames. The video processor is further configured to modify the video frame in accordance with the auxiliary data. The video processor uses the received auxiliary data to identify a portion of the at least one video frame, the portion being modified in the act of modifying the video frame, other portions of the at least one video frame not being so modified. The video processor applies a filter to the portion of the at least one video frame.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which.

DETAILED DESCRIPTION OF THE PREFERRED EMBODIMENT

Figure 1:
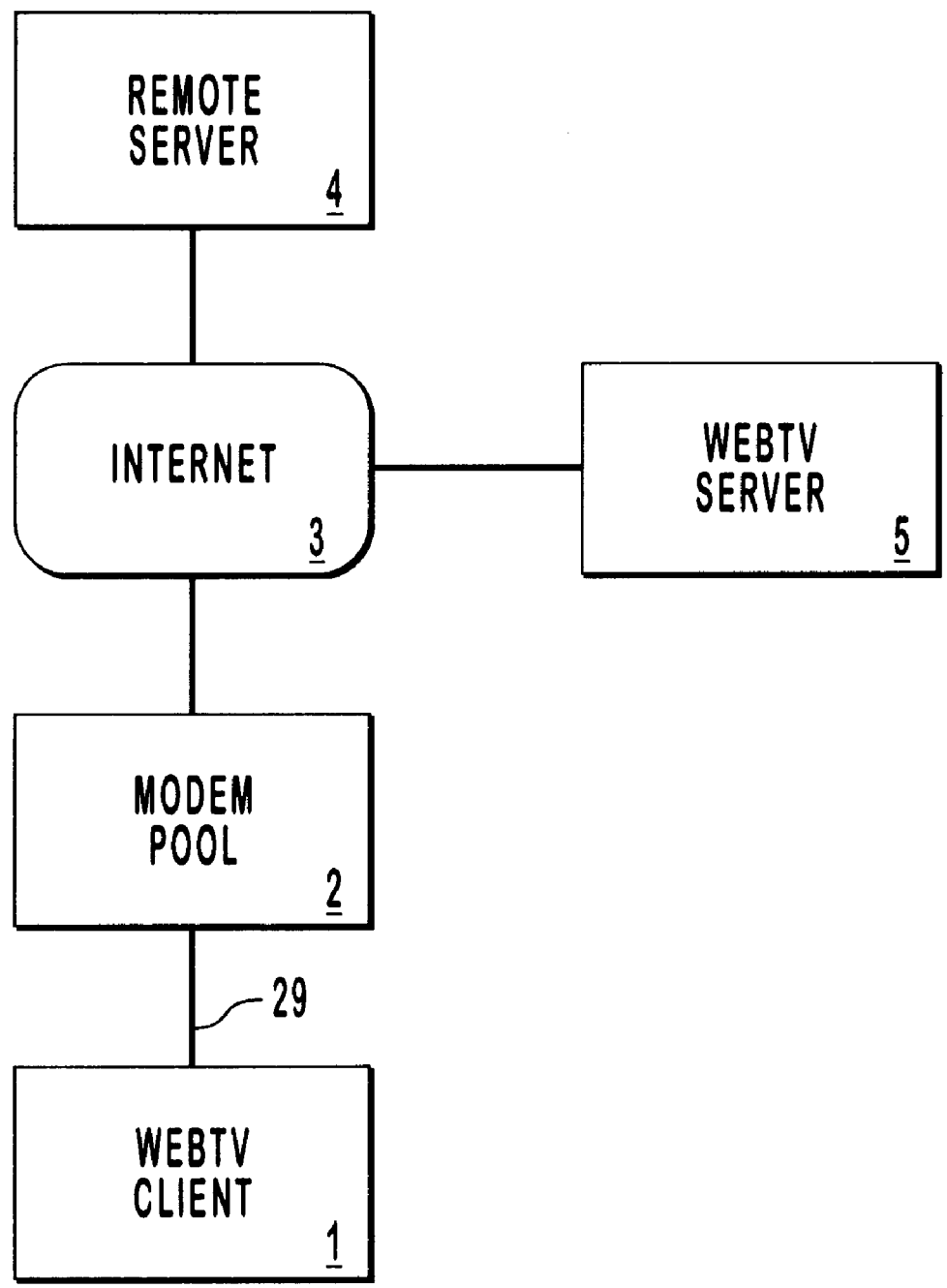
FIG. 1 illustrates a computer system in which the present invention is implemented.

An apparatus and method is described for combining digital data with a video stream and for using the digital data to modify or augment video frames in the video stream. In the following detailed description, numerous specific details are set forth in order to provide a thorough understanding of the present invention. It will be evident however to one of ordinary skill in the art that the present invention may be practiced without these specific details. In other instances, well known structures and devices are shown in blocked diagram form in order to avoid unnecessarily obscuring the present invention.

In one embodiment, steps according to the present invention are embodied in machine-executable software instructions, and the present invention is carried out a processing system by a processor executing the instructions, as will be described in greater detail below. In other embodiments, hardwired circuitry may be used in place of, or in combination with, software instructions to implement the present invention. The present invention relates in one embodiment to a system in which a client computer system is connected to one or more server computer systems over the internet. The client system enables its user to request and receive hypertext documents and other data from remote servers on the World Wide Web. In accordance with the preferred embodiment of the present invention, as will be described below in detail, at least one server acts as a proxy for the client by retrieving a video stream requested by the client from other servers, transcoding (modifying) the retrieved video stream to augment the video stream with digital data based on the content of the video stream, and then downloading the transcoded video stream to the client.

Another embodiment of the present invention is implemented on an Internet system such as the WEBTV™, brand Internet system developed by WebTV Networks™, Inc., of Palo Alto, Calif. The Internet system includes a standard television set as a display device for browsing the World Wide Web and connects to a conventional network, such as the Internet, using standard telephone, ISDN, or a similar network communication coupling. Further details of the Internet system, including the Internet system client can be found in co-pending U.S. Patent application entitled, "Web Browser Allowing Navigation Between Hypertext Objects Using Remote Control," having application Ser. No. 08/660,088, and filed on Jun. 3, 1996, now U.S. Pat. No. 6,034,689.

In accordance with the preferred embodiment of the present invention, a user of an Internet client system can utilize Internet network services provided by one or more remote Internet servers. The Internet network services are used in conjunction with software running in an Internet client system to browse the Web, send electronic mail, and to make use of the Internet in various other ways. The Internet servers function as proxies by retrieving from a remote server Web documents (e.g., Web pages), video streams, and other data requested by an Internet client system and then transmitting the requested information to the Internet client system.

I. System Overview

FIG. 1 illustrates a configuration of an Internet network according to one embodiment. An Internet client 1 is coupled to a modem pool 2 via direct-dial, bi-directional data connections 29, which may be a conventional telephone, i.e., "plain old telephone service" (POTS), ISDN (Integrated Services Digital Network) link, Ethernet, or any other suitable type of data connection. The modem pool 2 is coupled typically through a router, such as that conventionally known in the art, to a number of remote servers 4 (i.e., conventional Web servers) via a conventional network infrastructure 3, such as the Internet. The Internet system also includes an Internet server 5, which implements Internet Network services and specifically supports the Internet client 1. The server 5 generally includes one or more conventional computer systems. The server 5 may actually comprise multiple physical and logical devices connected in a distributed architecture. The client 1 can connect to the server 5 through POTS, ISDN, or Ethernet connection or through the Internet 3 via the modem pool 2. Note that the modem pool 2 is a conventional modem pool, such as those found today throughout the world providing access to the Internet and private networks. The modem pool 2 may be provided by a local Internet Service Provider (ISP).

A. Client System Architecture

Figure 2:
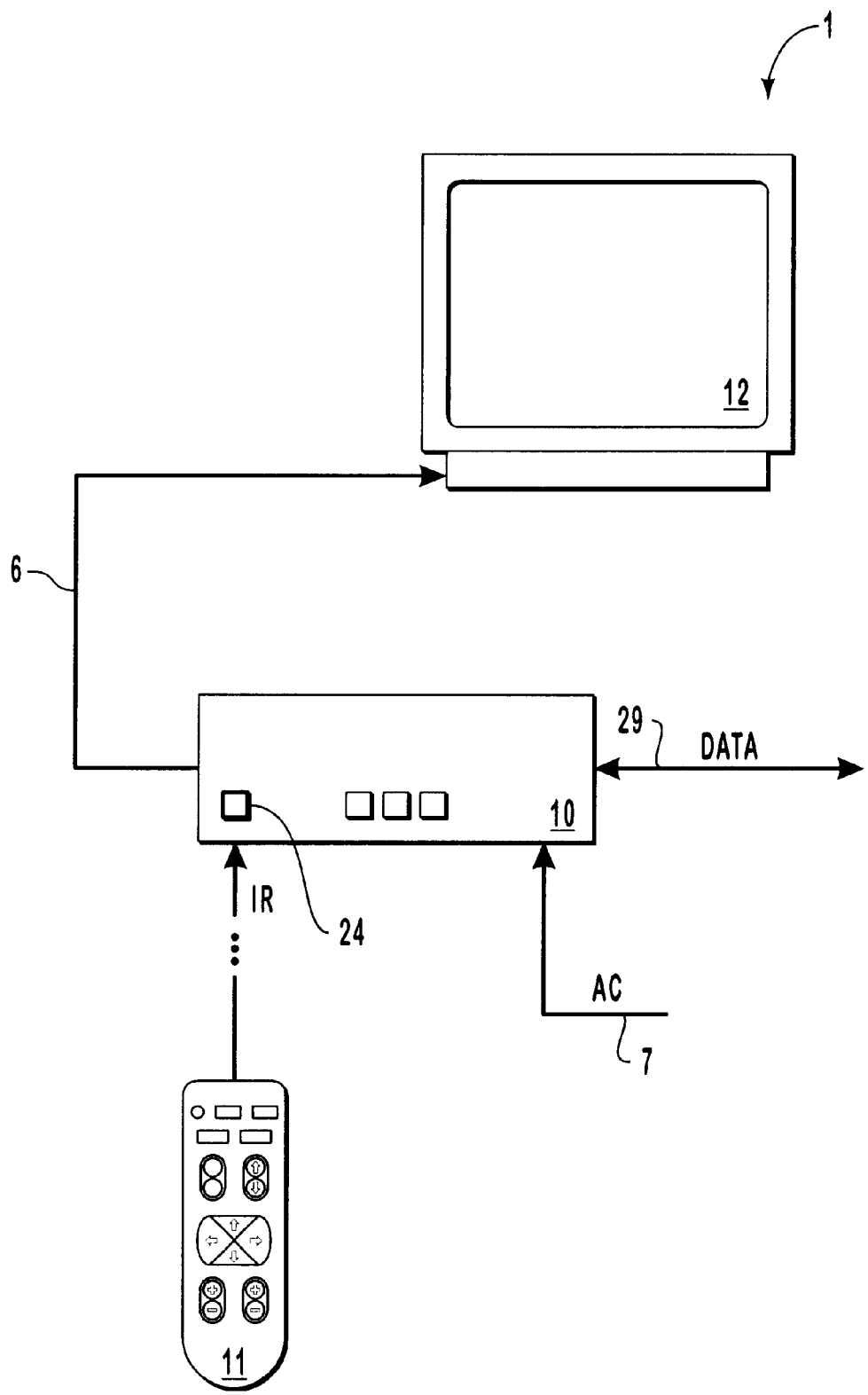
FIG. 2 illustrates an Internet client system.

FIG. 2 illustrates an Internet client system 1 according to one embodiment. The client system 1 includes an electronics unit 10 (hereinafter referred to as "the Internet box 10" or "the box 10"), an ordinary television set 12, and a hand-held remote control 11. In an alternative embodiment (not shown), the Internet box 10 is built into the television set 12 as an integral unit. The box 10 includes hardware and software for providing the user with a graphical user interface, by which the user can access the Internet Network services, i.e., browse the Web, send e-mail, etc.

The client system 1 uses the television set 12 as a display device and an audio output device. The box 10 is coupled to the television set 12 by a link 6. The link 6 includes an audio channel for generating sound from the television's speaker and an RF (radio frequency), S-video, composite video, or other equivalent form of video channel. The data link 29 between the box 10 and the Internet server 5 is a conventional telephone (POTS), ISDN, Ethernet, or other suitable data connection. The box 10 receives AC (alternating current) power through a standard AC power line 7.

Remote control 11 is operated by the user in order to control the client system 1 to browse the Web and otherwise access the Internet. The box 10 receives commands from remote control 11 via an infrared (IR) communication link. In alternative embodiments, the link between the remote control 11 and the box 10 may be an RF link or any other suitable type of link.

B. Server System Architecture

Figure 3:
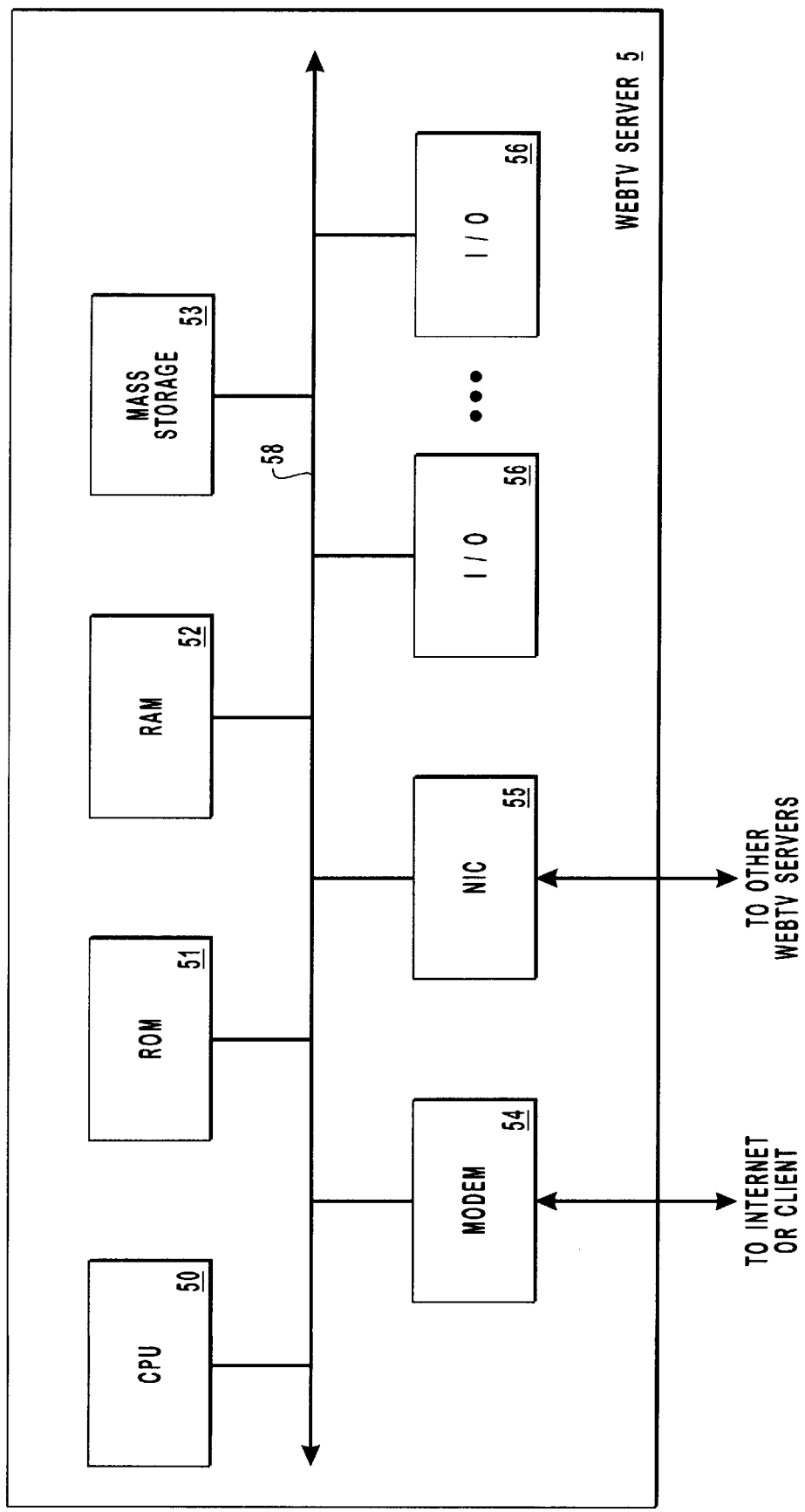
FIG. 3 illustrates an Internet server system.

The Internet server 5 generally includes one or more computer systems, each generally having the architecture illustrated in FIG. 3. It should be noted that the illustrated architecture is only exemplary; an Internet server is not constrained to the illustrated architecture. The illustrated architecture includes a central processing unit (CPU) 50, read-only memory (ROM) 51, random access memory (RAM) 52, a mass storage device 53, a modem 54, a network interface card (NIC) 55, and various other input/output (I/O) devices 56. Mass storage device 53 includes any suitable non-volatile storage medium, such as a magnetic storage disk or tape, CD-ROM (Compact Disk ROM), CD-R (Compact Disk Recordable), or DVD (Digital Versatile Disk). I/O devices 56 may include any or all of devices such as a display monitor, keyboard, cursor control device, etc. Modem 54 is used to communicate data to and from remote servers 4 via the Internet. Note that modem 54 may represent a standard telephone modem or any other suitable data communication device, such as an ISDN adapter, for example.

Because the server 5 may actually comprise multiple physical and logical devices connected in a distributed architecture, NIC 55 may be used to provide data communication with other devices that are part of the Internet services. Modem 54 may also be used to communicate with other devices that are part of the Internet services and which are not located in close geographic proximity to the illustrated device.

The present invention includes steps which may be embodied as machine-executable instructions. For example, in one embodiment the present invention is carried out in the Internet server 5 by the CPU 50 executing sequences of instructions contained in ROM 5 1, RAM 52, mass storage device 53, or a combination of these storage devices. More specifically, execution of the sequences of instructions causes the CPU 50 to perform the steps of the present invention. Such steps will be described below. Certain embodiments and aspects of the present invention may be carried out in the Internet client system 1 instead of, or in addition to, being carried out in the Internet server 5.

Computer instructions embodying the present invention may be loaded into memory from a persistent store (e.g., mass storage device 53) and/or from one or more other computer systems, referred to collectively as a "host computer system", over a network. For example, a host computer system may transmit the instructions to a requesting computer system in response to a message transmitted to the host computer system over the Internet 3 by the requesting computer system. As the requesting computer system receives the instructions via a network connection (e.g., a modem), the requesting computer system stores the instructions in a memory. The requesting computer system may store the instructions for later execution or execute the instructions as they arrive over the network connection. In some embodiments, the downloaded instructions may be directly supported by the requesting computer system's microprocessor. Consequently, execution of the instructions may be performed directly by the microprocessor. In other embodiments, the instructions may not be directly executable by the microprocessor. Under these circumstances, the instructions may be executed by causing the microprocessor to execute an interpreter that interprets the instructions, or by causing the microprocessor to execute instructions which convert the received instructions into instructions that can be directly executed by the microprocessor.

In various embodiments, hardwired circuitry may be used in place of, or in combination with, software instructions to implement the present invention. Thus, the present invention is not limited to any specific combination of hardware circuitry and software, nor to any particular source for the instructions executed by a computer system.

Figure 4:
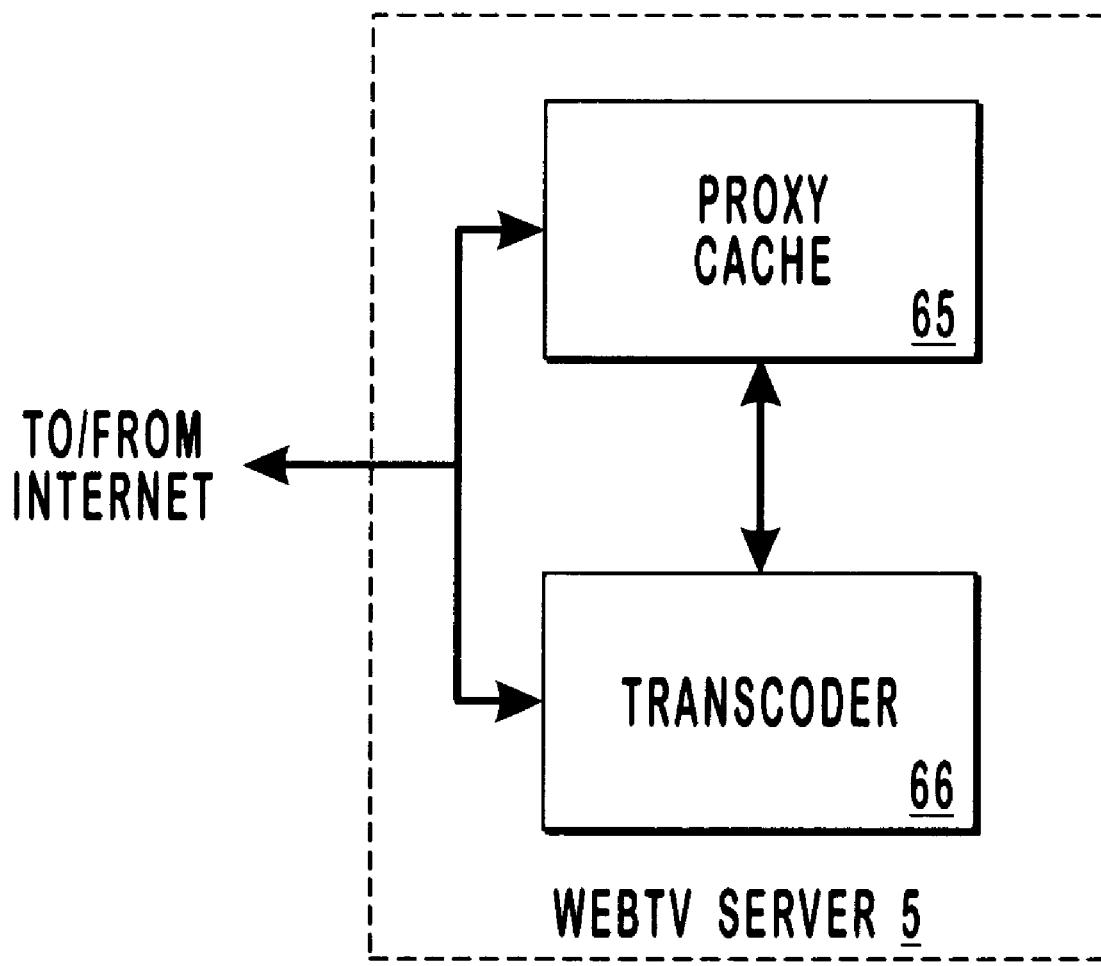
FIG. 4 illustrates an Internet server including a proxy cache and a transcoder.

The Internet server 5 generally functions as a proxy for the client 1 for purposes of providing the client 1 with access to a remote Web server 4 and to various services. In performing the proxy functions, the server 5 further provides caching and transcoding capabilities for the client 1, as illustrated in FIG. 4. Referring to FIG. 4, the Internet server 5 includes a transcoder 66 and a proxy cache 65, which are functionally coupled together and to the Internet 3. The function of the proxy cache 65 is to temporarily store Web documents, images, video data, and other information that is requested frequently by either the Internet client 1 or the server 5. The function of the transcoder 66 is to automatically modify certain documents, files, and video data retrieved from a remote server 4. Modification such as this is referred to herein as "transcoding". Transcoding may be performed for various different purposes, depending upon the type of data that is being transcoded.

In accordance with the present invention, one function of the transcoder 66 is to transcode video streams or video files requested by the client 1 to conform the video files to the hardware and software capabilities of the client 1 and to meet bandwidth constraints of the communication link between the server 5 and the client 1, as will now be described.

Video Transcoding

Transcoding of video data may include conversion of a video stream or video file from one data type to another, compression of video data, filtering the video data or a portion thereof, modifying the resolution, aspect ratio, scale, center, or color of video data, or a combination of these procedures or other procedures needed or desirable for conforming a video stream or video files to the hardware and software capabilities of a client device. Video transcoding according to the present invention includes augmenting a video stream with auxiliary digital data corresponding to the video stream. Transcoding in accordance with the present invention is not limited to the aforementioned operations, however.

Figure 5:
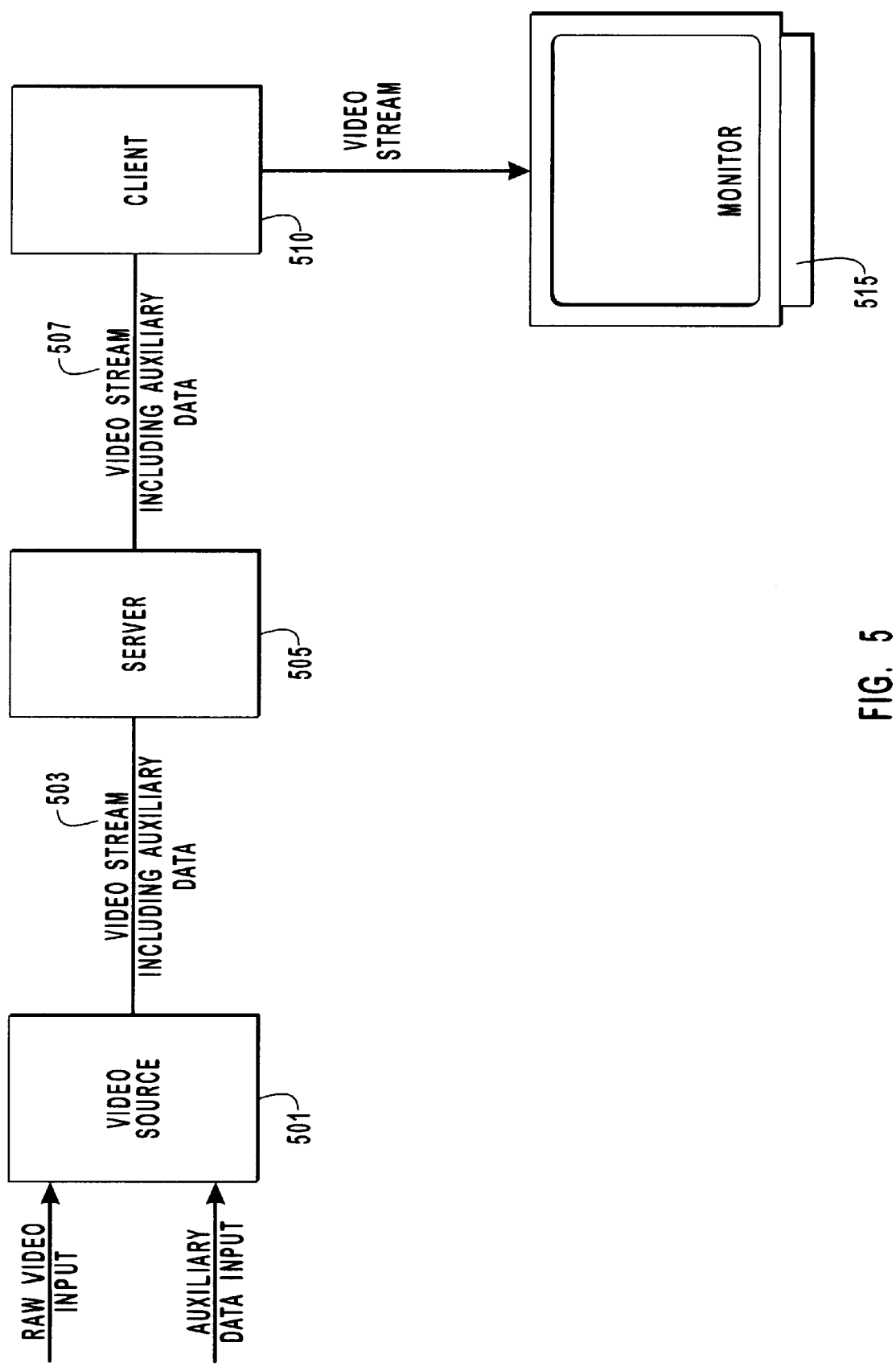
FIGS. 5–7 illustrate various system architectures of the system.
Figure 6:
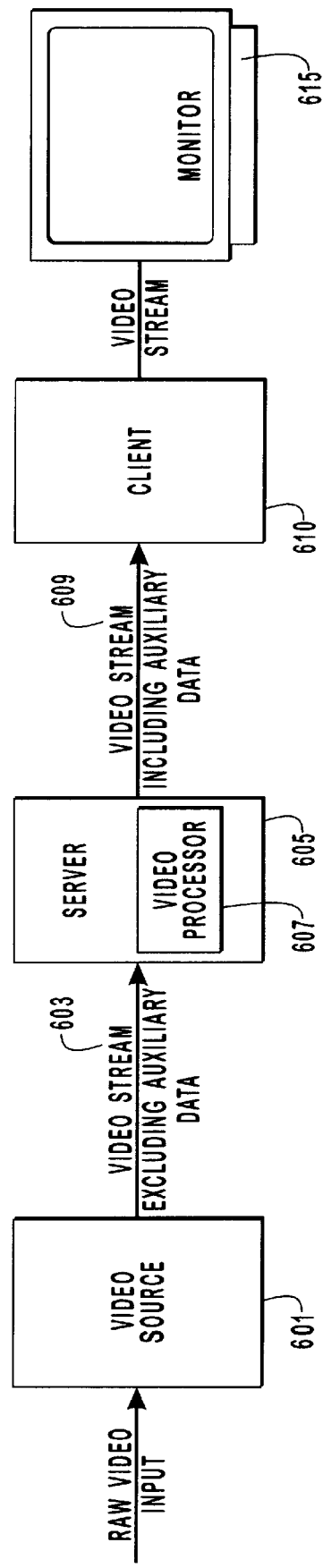
Figure 7:
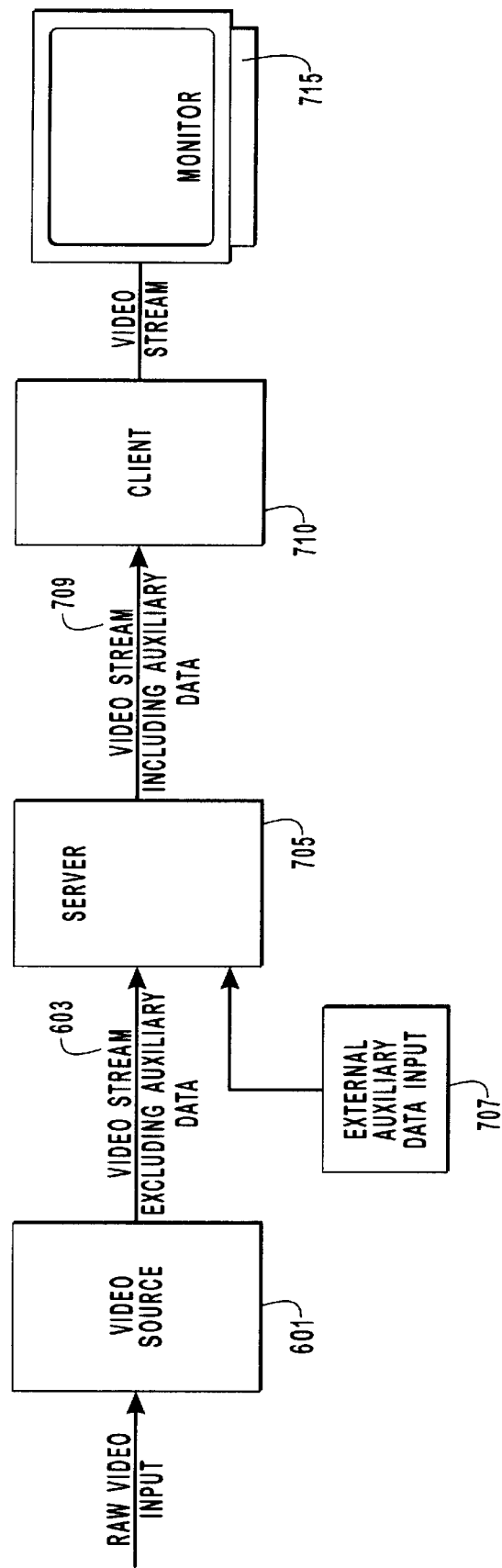

Referring now to FIGS. 5, 6, and 7, three alternative implementations are shown for merging auxiliary digital data with a raw video input stream. Referring to FIG. 5, a video source 501 is shown receiving raw video input and auxiliary data input. Video source 501 represents any of a variety of conventional systems for producing video content for general broadcast via air waves, cable, or transmission on a wide area network (WAN). Video source 501 typically includes conventional equipment for receiving multiple raw video input channels and mixing these multiple channels into a single video stream for output to various conventional broadcast media. The video stream produced by video source 501 may be a conventional analog video stream for transmission via a radio wave broadcast or cable system transmission. Alternatively, video source 501 may produce a digitized video stream comprising a conventional Motion Picture Experts Group (MPEG) digitized video stream that may be transmitted to client systems via conventional digital video transmission means. In each of these cases, according to the present invention, video source 501 takes raw video input and combines the raw video input with an auxiliary data input channel to produce a video stream including auxiliary data 503. The augmented video stream 503 is provided as input to server 505. By transmission via a conventional digital network, server 505 receives video stream including auxiliary data 503. Server 505 represents any of a variety of conventional computer systems connected to a standard network and including hardware and software for providing a variety of computing services to a plurality of client systems 510 located remotely on the network. In the embodiment illustrated in FIG. 5, the video stream 503 received by server 505 is passed through as video stream 507 to a client 510, which requested the video stream. The video images represented by video stream 507 may then be displayed on a video display monitor 515 coupled to client 510. In this manner, video images compiled by video source 501 may be transmitted across a computer network to a client 510 through a server 505. In this embodiment, video source 501 is responsible for combining the auxiliary data with the raw video input to produce a combined video and auxiliary data stream 503.

Referring now to FIG. 6, another embodiment of the present invention illustrates another system with which auxiliary data may be combined with a video stream. In this embodiment, a raw video input signal is received by a conventional video source 601. A variety of conventional video manipulations may be performed by video source 601 to produce an output video stream 603 without the auxiliary data as shown and described above in FIG. 5. In FIG. 6, video stream 603 excluding auxiliary data is provided to a server 605 across a computer network. In this embodiment, server 605 includes a video processor 607. Video processor 607 is responsible for receiving the video stream 603 and combining auxiliary data with video stream 603 to produce video stream 609 including auxiliary data. Augmented video stream 609 including auxiliary data may then be provided to a client system 610 across a computer network. In a manner similar to the system described above in connection with FIG. 5, client 610 receives the video stream 609 including auxiliary data and displays the representative video images on monitor 615. In this embodiment, server 605 has been modified to include a video processor 607. Such video processors for combining data and video are well known to those with ordinary skill in the art. The auxiliary data that is combined with video stream 603 to produce video stream 609 can be resident in memory within server 605 or obtained from a conventional mass storage device connected to server 605 (not shown).

Referring to FIG. 7, another embodiment of the present invention is illustrated. In this embodiment, server 705 is coupled with an external auxiliary data input source 707. In a manner similar to the embodiment described above and illustrated in FIG. 6, the server 705 receives a video stream 603 excluding auxiliary data from video source 601. External auxiliary data input source 707 may be a mass storage device having stored thereon auxiliary data files associated with particular identified content in video stream 603. External auxiliary data input source 707 may also be an interface to another processing device used for storage and manipulation of auxiliary data. Server 705 receives video stream 603 and combines this video stream with corresponding auxiliary data obtained from external auxiliary data input source 707. This combined video and auxiliary data stream 709 is provided to client 710 which displays the video imagery on monitor 715.

These embodiments of the present invention illustrate various ways of combining auxiliary data with a video stream. In each of these embodiments, either a video source or a server is responsible for combining the video stream with auxiliary data. Because the creation of a combined video/data stream may be a computation intensive operation, it is sometimes efficient for a server to perform this operation rather than the client in order to deliver the stream in "real-time". This is particularly true in the preferred embodiment of the present invention where the client system is designed to be a low cost and minimally configured processing system that may not have the processing power to perform the combination of the video signal with the auxiliary data signal within the necessary time constraints. It may also be convenient for the server to perform the combination of the video stream with the auxiliary data stream because the resulting combined video and auxiliary data signal may be fed to a plurality of similarly configured client systems.

Figure 8:
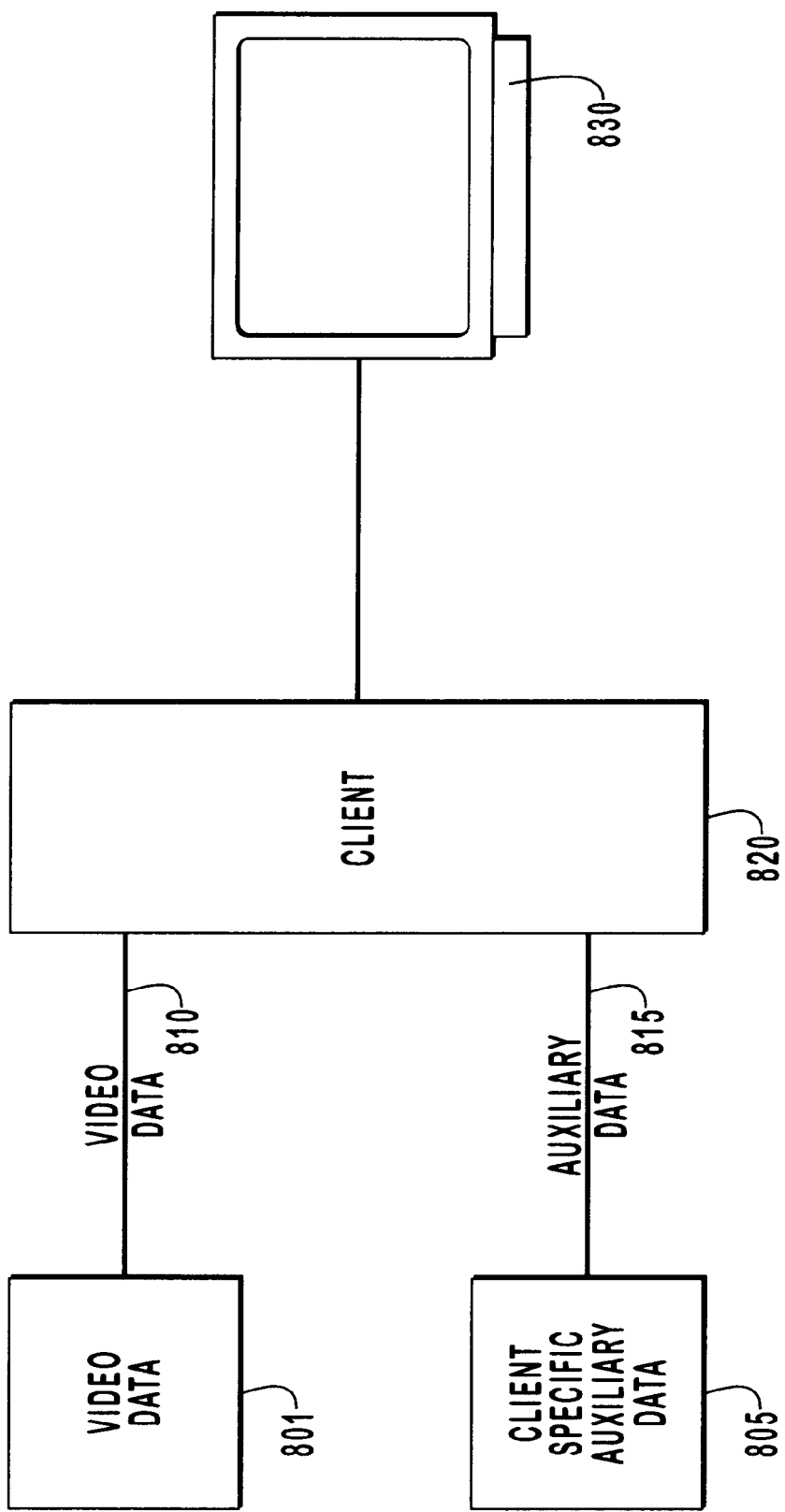
FIG. 8 illustrates the interfaces to the Internet client.

Although in the preferred embodiment of the present invention, the server performs the combination of a video stream with an auxiliary data stream, this combination of an auxiliary stream with a video stream may also be performed by the client device itself. This alternative embodiment is illustrated in FIG. 8. As shown in FIG. 8, the client device 820 receives video data 801 and client specific auxiliary data 805. Using the client specific auxiliary data 805, client device 820 can modify the video data 801 to produce modified video images which can then be displayed on display device 830. In this alternative embodiment, client device 820 must have the processing capacity necessary for manipulating video images within given timing constraints.

Having described how various embodiments of the present invention can combine auxiliary data with a video data stream for transmission to a client system, and having described how the preferred embodiment of the present invention uses a server for combining auxiliary data with a video stream, it now becomes necessary to explain how this auxiliary data can be used to manipulate the video images in the video stream with which the auxiliary data stream is combined.

The conventional television studio or network produces a stream of video images for broadcast to a wide variety of viewers using a wide variety of electronic equipment to view the broadcast. Although the broadcasters must conform to basic television broadcast standards, nevertheless a wide variety of different kinds of television monitors and client devices exist in the viewing public. This variety of television equipment and client devices can produce a variety of different video images on a plurality of client systems even if the client systems are all receiving the same video stream. Because the same video stream may result in a different display on different display devices, it is impossible to tune the video stream to produce an optimal display on all types of display devices. Rather, it is necessary to manipulate or modify the video stream for a particular client viewer having a specific type of display device. However, as described above, many types of client devices do not have the processing capability to perform these kinds of manipulations or modifications of a video stream within a given time constraint.

By way of example, but not limitation, the manipulations or modifications needed to make a video stream conform to the display characteristics of a particular display device may include a variety of operations. It may be necessary, for example, to crop the edges of a video image for display on a particular type of display device. It may also be necessary to center a video image for a particular type of display device. Sometimes it is necessary to rescale a video image in one or both dimensions in order to conform the video image optimally to a particular type of display device. Another well known video manipulation technique is letter boxing. Letter boxing is sometimes necessary to render a motion picture on a video display device. Another video manipulation operation that may be necessary to display an image on a display device is filtering.

Filtering a video image is sometimes necessary to remove unwanted artifacts or features that may cause flicker. The flicker problem may be particular troublesome on interlaced video display monitors. Flicker is also a problem when text or computer generated graphics are displayed on a television set.

Figure 9:
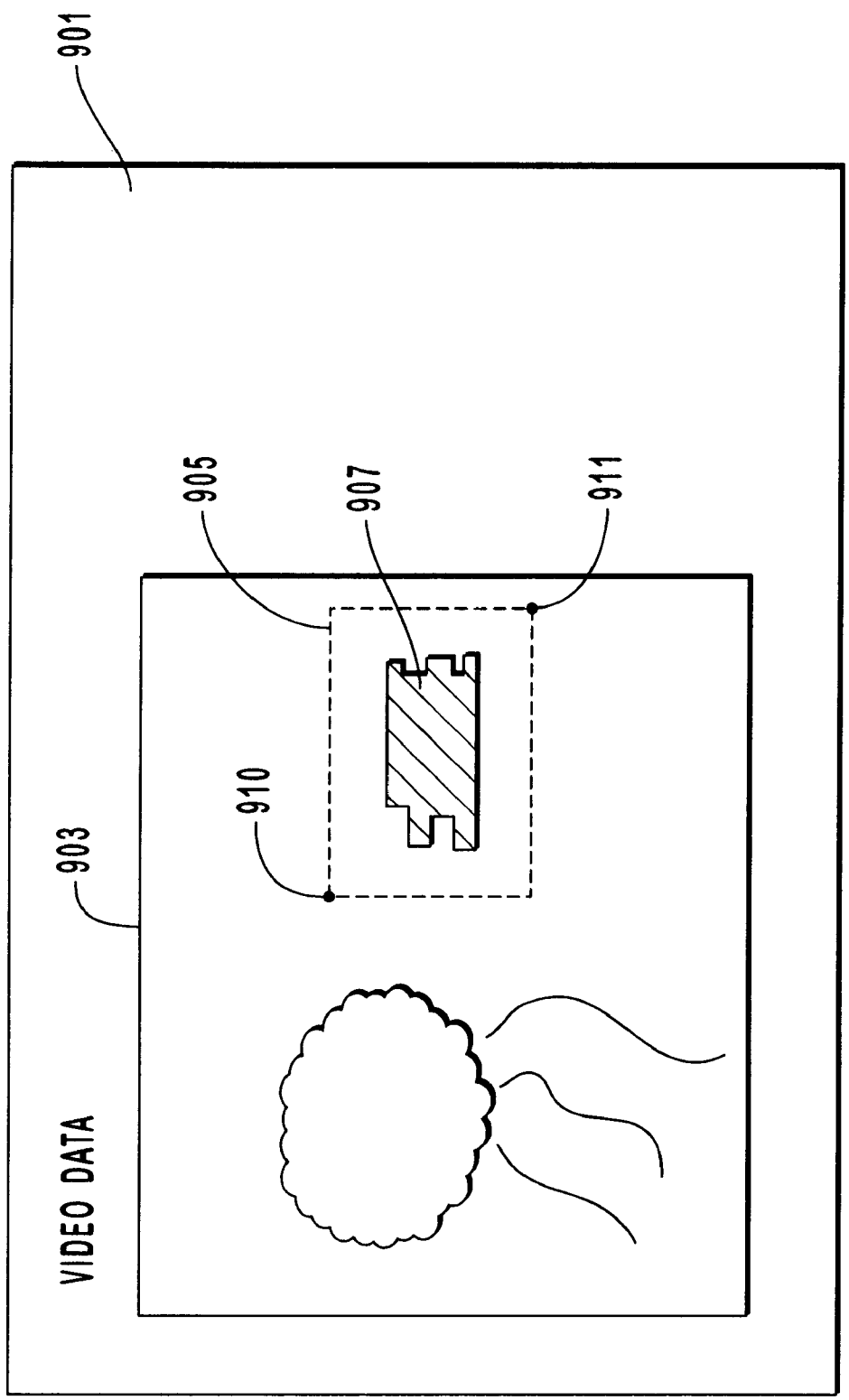
FIG. 9 illustrates a sample display image.
Figure 10:
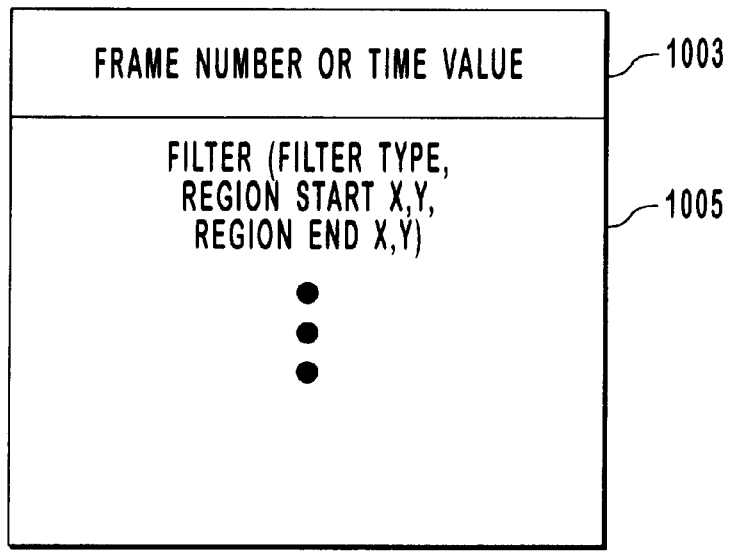
FIGS. 10–11 illustrate various formats of the auxiliary data.
Figure 11:
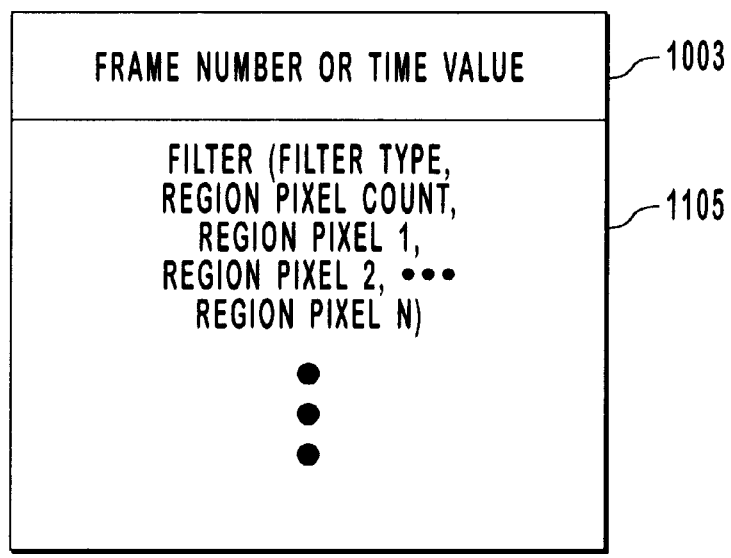

The present invention provides a means and method for encoding auxiliary information into a video stream to assist a client device in optimally displaying a video image on the client's particular type of display device. Referring now to FIGS. 9, 10, and 11, a means and method are shown for encoding image filtering information into the auxiliary data portion of a combined video and data stream.

Referring to FIG. 9, a display device 901 is represented as displaying a video image 903. In this example, video image 903 include a troublesome artifact or feature 907, which should be filtered in some way to produce a visually appealing video image on the particular display device 901. Although many types of filtering methods are known to those of ordinary skill in the art, these conventional video image filtering techniques are typically applied to the entire image 903. While this may be a simple solution for filtering a video image, filtering often consumes a high degree of processing power, especially when an entire video image is processed through a filter. In the environment of the present invention, this processing power on the client system may not be available. Further, it may be undesirable to filter the entire image if other portions of the image may be negatively affected. Thus, it is necessary to identify only those portions of video image 903, such as region 905, that must be filtered. These regions can be identified by server 605 based on an analysis of incoming video stream 603.

The analysis of the input video stream performed on server 605 can be accomplished in several ways. First, a person located at server 605 may view the input video stream and explicitly identify portions of any of the video images of the video stream that need to be selectively filtered. Using a conventional user interface the person may identify rectangular regions of a particular video frame that need to be filtered. The x, y coordinates of the selected region may be retained in memory in server 605 along with the frame number, sequence number, or synchronized time value corresponding to the video frame in which the selected region was identified. By repeating this process for each video frame in the video stream, the person may identify a set of video frames and a set of selected regions within those video frames for which filtering operations need to be performed. This set of frame identification and selected region information retained by server 605 forms the basis of the auxiliary data that is subsequently encoded into the video stream or retained in an off-line file by server 605.

Referring to FIG. 10, an example of such an encoding is illustrated. Auxiliary data 1001 comprises a frame number or time value 1003 used to identify a particular video frame or location within a video stream. Auxiliary data 1001 also includes information identifying a function to be performed on the identified video frame. In this example, a filter function is to be performed. The filter function includes information identifying a rectangular region within the particular video frame identified by frame number 1003. The function information, specifying a filter operation 1005, is used to identify a rectangular portion of the video frame and the identifier of a type of filter operation to be performed on the specified rectangular region. Depending on the type of artifact or feature located on within the specified region, various types of conventional filtering methods may be used to handle the particular type of artifact or feature. The person analyzing the video stream may make this determination. Using the information encoding format illustrated in FIG. 10, a plurality of frame numbers and corresponding function information may be specified within auxiliary data 1001. Further, multiple filtering regions may be defined for a single frame number. In this manner, a plurality of rectangular regions within the same video frame may be handled as specified by auxiliary data 1001.

Referring now to FIG. 11, an alternative embodiment of the auxiliary data format for specifying filter function information is illustrated. As shown in FIG. 11, auxiliary data 1101 comprises a frame number or time value 1003 that identifies a particular video frame. In auxiliary data 1101, the filter function information 1105 can represent an arbitrarily shaped polygon as defined by corner pixels specified in filter function information 1105. Similar to the filter information format shown in FIG. 10, filter information 1105 includes a filter type that identifies the conventional filtering method to be used for the specified region. Additionally, filter information 1105 includes a plurality of pixel definitions that specify the corners of the specified region in the video frame. A region pixel count identifies the number of pixels that identify the enclosed region. Again, the auxiliary data 1101 may include a plurality of video frames and a plurality of filter function information for each video frame. In this manner, portions of a video frame may be specified along with a filtering method to be used on the specified region.

The auxiliary data 1001 or 1101 that specifies filtering information is generated in server 605 and combined with video stream 603 and sent to a client device 610 as a combined video stream and auxiliary data 609. Client device 610 receives the auxiliary data 1001 or 1101 along with the corresponding video stream. Using conventional techniques, client device 610 can separate the auxiliary data from the video stream. Client 610 may thereafter separately process the auxiliary data from the video stream. By knowing the pre-defined format used to encode the auxiliary data, client device 610 may decode the auxiliary data. In the example of filtering information illustrated in FIGS. 10 and 11, client device 610 may interpret the filtering information received from server 605. Using this filtering information, client device 610 identifies the regions of the video streams specified by the auxiliary data and applies the specified filtering method to the video frames specified by the auxiliary data. Because the client device 610 does not need to filter every video frame or the entirety of selected video frames, the processing requirements of the client device 610 for processing the video streams are greatly reduced. Thus, client device 610 can produce a filtered video stream for optimal display on display device 618 to which it is connected.

Figure 12:
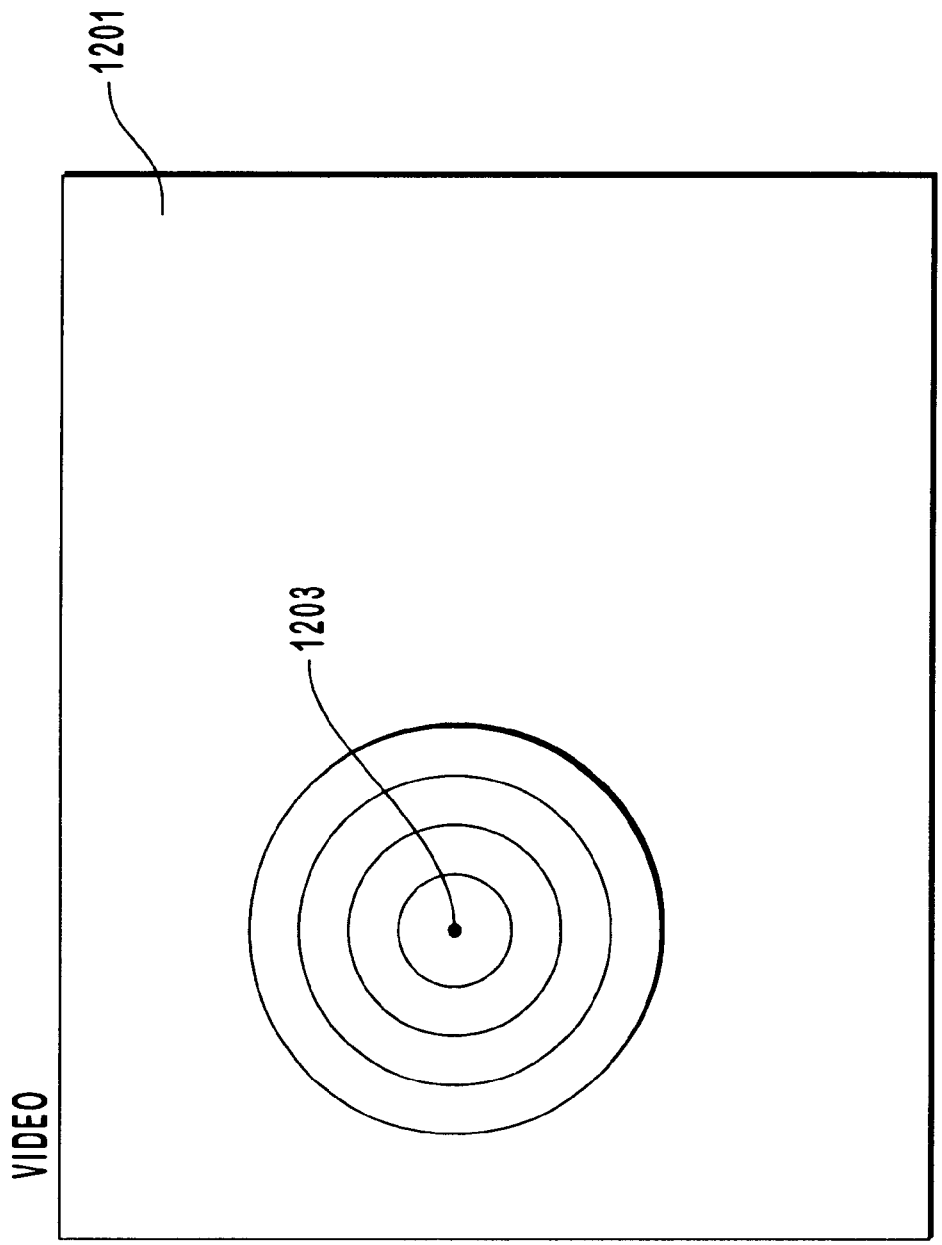
FIG. 12 illustrates another sample display image.

Referring now to FIG. 12, a display device 1201 is represented as displaying a video image 1203. In this example, it may be desirable to center video image 1203 in display device 901. Different types of display devices may require slightly varied parameters for centering video images on the display. As described above, based on an offline analysis of particular types of display devices and particular video streams being displayed on these display devices, individual frames of the video stream or the entirety of the video stream may be recentered on a particular type of display device using the present invention. In manners similar to that described above for a filtering function, recentering information may be encoded into a video stream or retained in an offline file by server 605.

Figure 13:
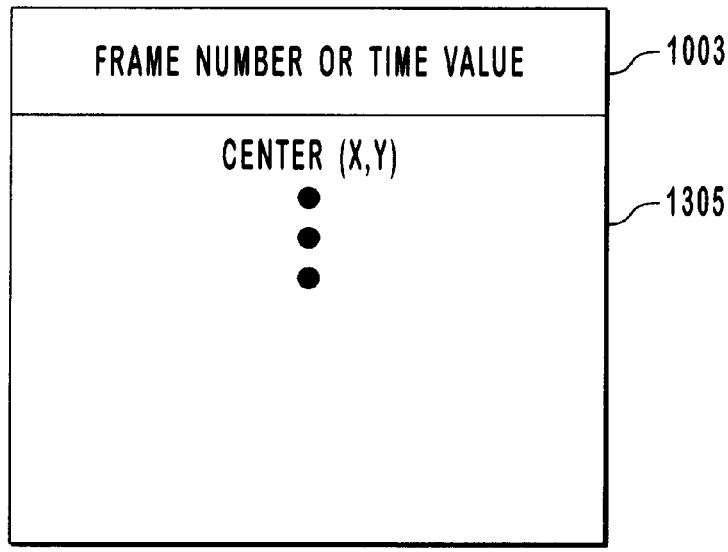
FIGS. 13–21 illustrate other various formats of the auxiliary data.

Referring now to FIG. 13, an example of such encoded data for performing an image centering function is illustrated. The centering information is retained within auxiliary data 1301. As described above, auxiliary data 1301 includes a frame number or time value 1303 used to identify a particular video frame or location within the video stream. Auxiliary data 1301 also includes information identifying a function to be performed on the identified video frame. In this example, a centering function is to be performed. The centering function includes information identifying a point in the video image defined as the display center. In the preferred embodiment, the center point can be defined using x and y coordinates of a Cartesian two-dimensional space on the display device. In an alternative embodiment, the display center point can be defined relatively from a reference point defined at one of the corners of the display device. Alternatively, the pixel count or polar coordinate method may be used along with other methods for defining a center point of a particular type of display device. These alternative forms may similarly be encoded as parameters into the center function 1305 of auxiliary data 1301. Once this auxiliary data 1301 is encoded with a video stream or retained offline by a server; the auxiliary data 1301 may be used to modify the video images on a particular display device.

Referring now to FIGS. 14–21, various alternative implementations of auxiliary data are shown. In each case, this auxiliary data may be encoded into a video stream or retained offline and associated with a particular video stream. This auxiliary data can be used by a server to configure a video stream for a particular client system or display device.

Figure 14:
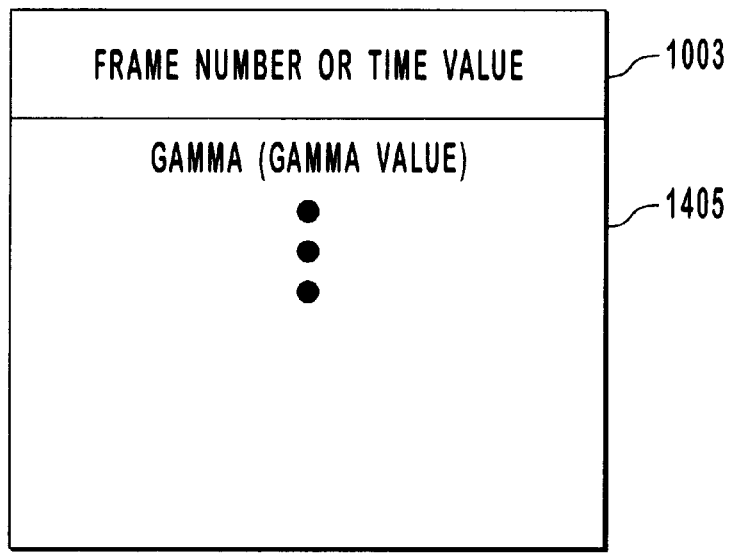

Referring now to FIG. 14, auxiliary data 1401 includes the frame number or time value 1003 as described above. In addition, auxiliary data 1401 includes a gamma function 1405. Gamma function 1405 provides a means to configure a particular type of cathode ray tube (CRT) monitor with a specific gamma value. The gamma value enables the appropriate configuration of the electromagnetic characteristics of a particular type of display device.

Figure 15:
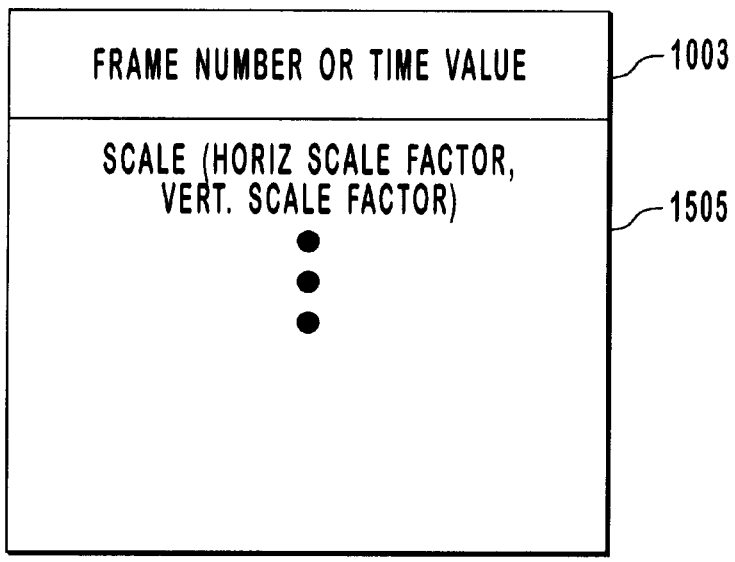

Referring now to FIG. 15, auxiliary data 1501 includes a frame number or time value 1003 as described above. In addition, auxiliary data 1501 includes a scaling function 1505. Scaling function 1505 provides a means for configuring the scale of a particular video frame as defined by a specified horizontal scale factor and a vertical scale factor. Using the information specified by the scale function 1505, a particular video frame can be scaled for display on a particularly sized display device without losing any content of the video frame.

Figure 16:
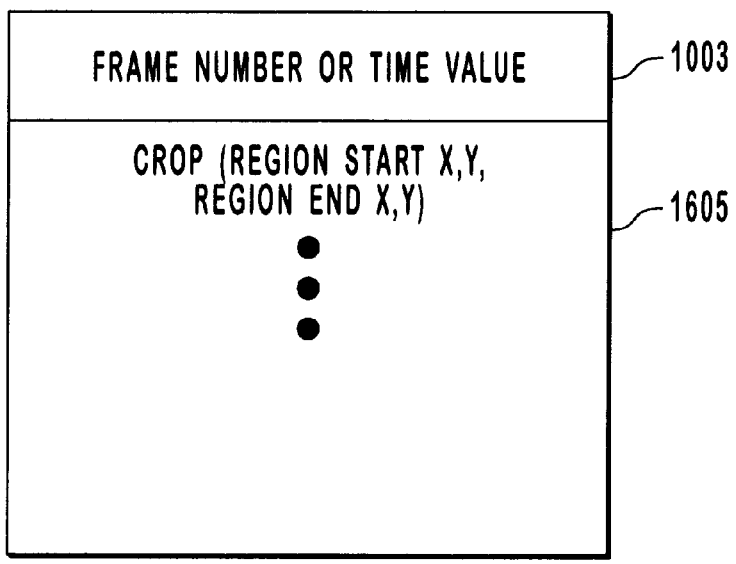

FIG. 16 illustrates another embodiment of the auxiliary data 1601. In this case, auxiliary data 1601 includes a cropping function 1605. Cropping function 1605 provides a means for eliminating a portion of the video frame in order to make the video frame fit on a particular display device. The cropping function 1605 specifies a region of the video frame defined by a region start xy location and a region end xy location. Alternatively, the crop function 1605 may specify two regions, one region on the left hand side and one region on the right hand side of the video frame or one region on top and one region on the bottom of a video frame. In each case, the region specified by the crop function 1605 is eliminated from the video frame identified by frame number 1003.

Figure 17:
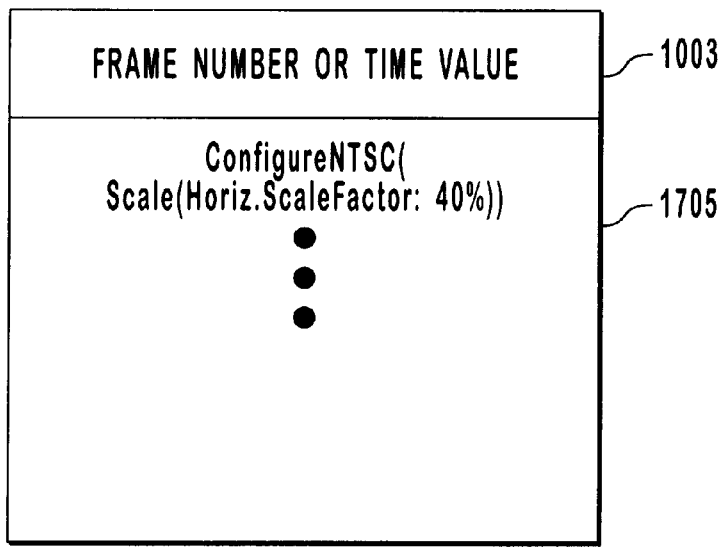

Referring now to FIG. 17, another alternative of the auxiliary data 1701 is illustrated. In this example, auxiliary data 1701 includes a configure NTSC 1705. The configure NTSC function specifies the enabling of a set of parameters corresponding to the conventional NTSC television display format. In the example illustrated in FIG. 17, the configure NTSC function 1705 includes the specification of a particular horizontal scaling factor. However, many other parameters may similarly be associated with the configuration of an NTSC type of display device.

Figure 18:
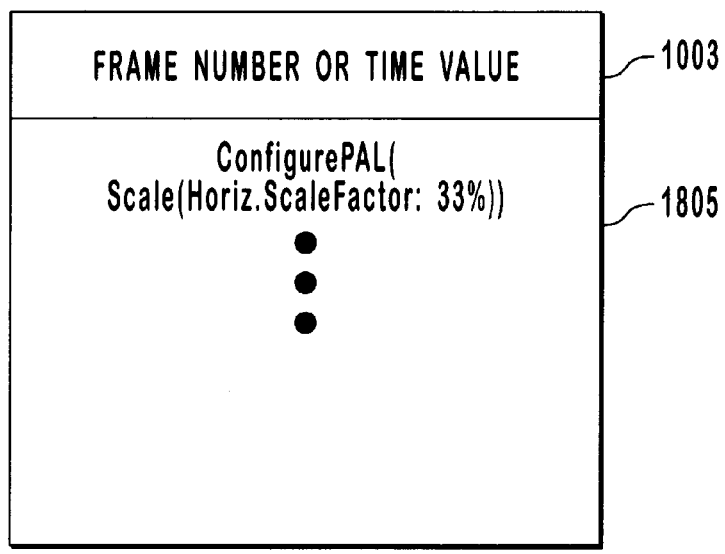

Referring to FIG. 18, another alternative of auxiliary data 1801 is illustrated. In this example, a configure PAL function 1805 is included in auxiliary data 1801. In a manner similar to the example shown in FIG. 17, the configure PAL function provides a means for specifying a set of parameters corresponding to the conventional PAL television display standard. Again, a particular horizontal scaling factor is illustrated for example in FIG. 18. It will be well known to those of ordinary skill in the art however that many additional parameters may be provided for configuring a particular device as a PAL compliant display device. This set of parameters may be encoded into auxiliary data 1801 and associated with a particular video stream and client display device in the manner described above.

Figure 19:
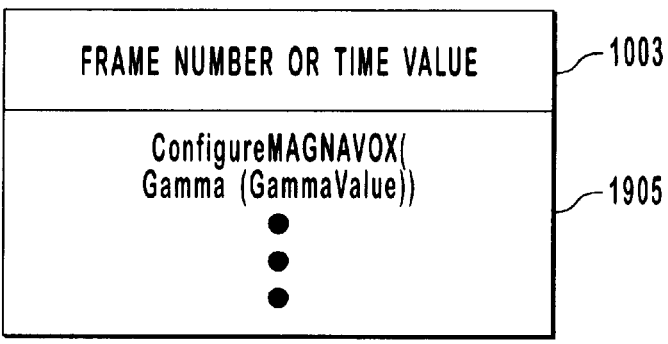

Referring now to FIG. 19, another alternative implementation of auxiliary data 1901 is illustrated. In this example, auxiliary data 1901 includes a function 1905 for specifying the configuration of a particular type of television set. In equivalent alternative embodiments, many other types of television sets or display monitors may similarly be configured by defining a function or set of functions corresponding to the configuration of that particular type of device.

Figure 20:
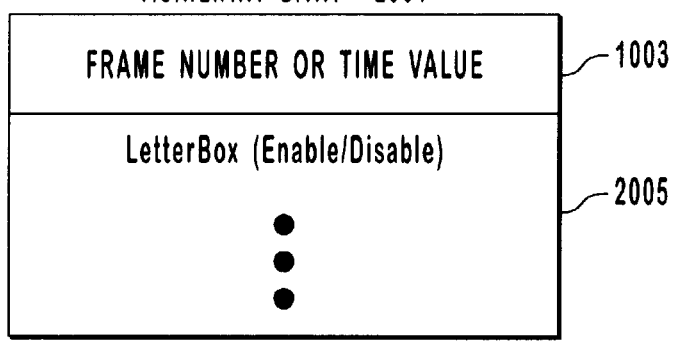

Referring now FIG. 20, auxiliary data 2001 includes a letter box function 2005. A letter box function 2005 is used to enable or disable a conventional letter boxing technique for displaying feature films on a television set.

Figure 21:
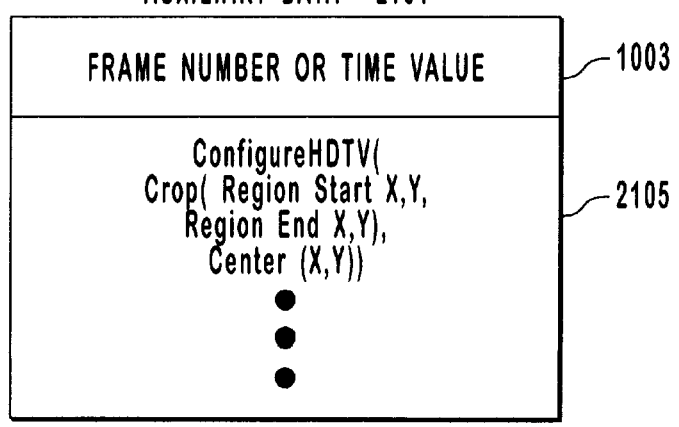

FIG. 21 illustrates an example of the auxiliary data 2101 used to configure a high-definition television set. Auxiliary data 2101 includes a configure HDTV function 2105 for specifying the parameters associated with high-definition television. In this example, several parameters or functions are used in auxiliary data 2101 to configure the HDTV display device. It will be apparent to those of ordinary skill in the art that other types of auxiliary data for configuring the display of a video stream on a particular type of display device can be implemented based on the disclosure of the present invention as described herein.

Although the present invention has been described with reference to specific exemplary embodiments, it will be apparent to those of ordinary skill in the art that various modifications and changes may be made to these embodiments without departing from the broader spirit and scope of the present invention as set forth in the following claims.

We claim:

1. In client a system including a processor and a video display device, a method for modifying a video stream received at the client system, such that the video generated using the video stream conforms to display characteristics of the video display device, the method comprising the acts of:

receiving at the client system a video stream that includes a plurality of video frames;

decoding at the client system auxiliary data that has been combined with the video stream, the auxiliary data including:

information identifying a particular video frame of the plurality of video frames; and information identifying a function that is to be applied to the particular video frame in order to modify the particular video frame to conform to the display characteristics of the video display device; and modifying at the client system the particular video frame in accordance with the auxiliary data by applying the function to the particular video frame.

2. The method as claimed in claim 1 further including an act of using the received auxiliary data to identify a portion of said particular video frame, said portion being modified in the act of modifying the particular video frame, other portions of said particular video frame not being so modified.

3. The method as claimed in claim 2 wherein the act of modifying the particular video frame comprises the act of applying a filter to said portion of said particular video frame.

4. The method as claimed in claim 1 further including an act of defining a video frame center point, wherein the function comprises centering the particular video frame at the video frame center point.

5. The method as claimed in claim 1, wherein the function that is to be applied to the particular video frame comprises a gamma function associated with the video display device, which enables the particular video frame to be displayed on the video display device in accordance with the gamma function.

6. The method as claimed in claim 1, wherein the function that is to be applied to the particular video frame is a scaling function, whereby the particular video frame, in the act of modifying, is scaled for display on the video display device, which has a particular size, without losing any content of the particular video frame.

7. The method as claimed in claim 1, wherein the function that is to be applied to the particular video frame is a cropping function, whereby a portion of the particular video frame is eliminated in the act of modifying in order to enable the particular video frame to fit the video display device.

8. The method as claimed in claim 1, wherein the video display device is a television conforming to the NTSC television standard, and wherein the function that is to be applied to the particular video frame enables the particular video frame to be configured for display on the television according to the NTSC television standard.

9. The method as claimed in claim 1, wherein the video display device is a television conforming to the PAL television standard, and wherein the function that is to be applied to the particular video frame enables the particular video frame to be configured for display on the television according to the PAL television standard.

10. The method as claimed in claim 1, wherein the function that is to be applied to the particular video frame is a letter box function, whereby a the particular video frame is modified, in the act of modifying, to be displayed in a letter box format on the video display device.

11. The method as claimed in claim 1, wherein the video display device is a television conforming to a high-definition television standard, and wherein the function that is to be applied to the particular video frame enables the particular video frame to be configured for display on the television according to the high-definition television standard.

12. An apparatus for modifying a video stream such that the video stream conforms to display characteristics associated with the apparatus, the apparatus comprising:

a video receiver configured to receive a video stream that includes a plurality of video frames;

a video processor configured to perform the acts of:
    decoding auxiliary data that has been combined with the video stream, the auxiliary data including:
        information identifying a particular video frame of the plurality of video frames; and
        information identifying a function that is to be applied to the particular video frame in order to modify the particular video frame to conform to the display characteristics of the video display device; and
    modifying the particular video frame in accordance with the auxiliary data by applying the function to the particular video frame.

13. The apparatus as claimed in claim 12 wherein the video processor uses the received auxiliary data to identify a portion of said particular video frame, said portion being modified in the act of modifying the particular video frame, other portions of said particular video frame not being so modified.

14. The apparatus as claimed in claim 13 wherein the video processor applies a filter to said portion of said particular video frame to perform the act of modifying the particular video frame.

15. The apparatus as claimed in claim 12 wherein the video processor defines a video frame center point, wherein the function comprises centering the particular video frame at the video frame center point.

16. In a client system including a processor and a video display device, a method for modifying a video stream received at the client system, such that the video generated using the video stream conforms to display characteristics of the video display device, the method comprising the acts of:

receiving at the client system a video stream that includes a plurality of video frames;

decoding at the client system auxiliary data that has been combined with the video stream, the auxiliary data including:
    information identifying a particular video frame of the plurality of video frames;
    information identifying a selected region of the particular video frame; and
    information identifying a filtering function that is to be applied to selected region of the particular video frame in order to modify the particular video frame to conform to the display characteristics of the video display device; and at the client system, applying the filtering function to the selected region of the particular video frame without applying the filtering function to portions of the particular video frame other than the selected region.

17. The method as claimed in claim 16, wherein the auxiliary data has been combined with the video stream at a server computer from which the client computer receives the video stream.

18. The method as claimed in claim 17, wherein the auxiliary data has been combined with the video stream at the server computer in response to input provided to the server computer from a user of the server computer.

* * * * *

UNITED STATES PATENT AND TRADEMARK OFFICE
CERTIFICATE OF CORRECTION

PATENT NO.    : 6,141,693
DATED         : October 31, 2000
INVENTOR(S)   : Stephen G. Perlman; Phil Goldman It is certified that error appears in the above-identified patent and that said Letters Patent is hereby corrected as shown below:

Title page,
Assignee, change "Webtv" to -- WebTV --

Column 1,
Line 42, after "As" and before "well" insert -- is --

Column 5,
Line 31, change "ROM 5 1" to -- ROM 51 --

Column 9,
Line 5, after "may be" change "particular" to -- particularly --
Line 18, after "903" change "include" to -- includes --

Column 12,
Line 56, after "In" change "client a" to -- a client --

Column 13,
Line 53, after "whereby" and before "the" delete [a]

Signed and Sealed this

Twenty-fifth Day of December, 2001

Attest:

JAMES E. ROGAN
Attesting Officer      Director of the United States Patent and Trademark Office